(12) United States Patent
Ferreira

(10) Patent No.: US 7,326,354 B2
(45) Date of Patent: Feb. 5, 2008

(54) ACTIVE BARRIER FOR POLLUTED WATERS AND METHOD FOR ITS INSTALLATION

(76) Inventor: Rodrigo Carvalho Ferreira, Rua da Passagem N 107 -casa 05, Botafogo, 22290-030 Rio de Janeiro (BR)

( * ) Notice: Subject to any disclaimer, the term of this patent is extended or adjusted under 35 U.S.C. 154(b) by 5 days.

(21) Appl. No.: 10/533,511

(22) PCT Filed: Oct. 30, 2003

(86) PCT No.: PCT/BR03/00152

§ 371 (c)(1),
(2), (4) Date: May 2, 2005

(87) PCT Pub. No.: WO2004/040067

PCT Pub. Date: May 13, 2004

(65) Prior Publication Data

US 2006/0000756 A1    Jan. 5, 2006

(30) Foreign Application Priority Data

Oct. 30, 2002    (BR) .................................. 0204546

(51) Int. Cl.
*E02B 15/04*    (2006.01)
(52) U.S. Cl. ............. 210/776; 210/170.11; 210/242.3; 210/923; 405/63; 405/70
(58) Field of Classification Search ................ 210/747, 210/776, 242.3, 242.4, 170, 923, 924; 405/63, 405/70
See application file for complete search history.

(56) References Cited

U.S. PATENT DOCUMENTS

| 3,221,884 | A | * | 12/1965 | Muller | ..................... 210/242.3 |
| 3,369,664 | A | * | 2/1968 | Dahan | .......................... 405/70 |
| 3,618,768 | A | * | 11/1971 | Brown | ........................ 210/923 |
| 3,666,098 | A | * | 5/1972 | Garland et al. | ........... 210/242.3 |
| 3,686,869 | A |   | 8/1972 | Manuel | |
| 3,700,593 | A | * | 10/1972 | Bezemer | ................... 210/242.4 |
| 3,744,638 | A | * | 7/1973 | Rhodes | ..................... 210/242.4 |

(Continued)

FOREIGN PATENT DOCUMENTS

EP        EP 578147       *   1/1994

*Primary Examiner*—Christopher Upton
(74) *Attorney, Agent, or Firm*—Traskbritt, PC

(57) ABSTRACT

The invention relates to an active barrier (1) and a method for its use. The active barrier (1) is used to contain and to collect polluting material floating over bodies of water, such as river, lakes, lagoons, bays or open oceans. More specifically, the active barrier is used in a situation in that pollution is caused by a liquid lighter than the water and immiscible with it, such as oil. The invention comprises a plurality of floating containment modules (3) which are interlinked to form the active barrier (1). When the latter is used in the open ocean it is required to use two supporting units (2), e.g. two vessels, to surround the mass of floating polluting material. Each containment module (3) is provided with collecting tubes (33), into which impeller modules (411) displace in a predetermined direction. The impeller modules (411) may be continuous or spaced apart. The displacement of the impeller modules (411) causes a pumping effect of pollutes water into the collecting tubes (33), and thereby the polluted waters are continuously pumped to traction and treatment assemblages (4) located at the supporting units (2).

11 Claims, 8 Drawing Sheets

U.S. PATENT DOCUMENTS

| | | | |
|---|---|---|---|
| 4,033,137 A | 7/1977 | Geist | |
| 4,052,313 A * | 10/1977 | Rolls | 210/242.3 |
| 4,062,191 A | 12/1977 | Preus | |
| 4,068,478 A | 1/1978 | Meyers et al. | |
| 4,146,477 A * | 3/1979 | Challener | 210/776 |
| 4,356,089 A * | 10/1982 | Challener et al. | 210/242.4 |
| 4,381,994 A | 5/1983 | Ayers | |
| 4,988,438 A * | 1/1991 | Eddleman | 210/242.3 |
| 5,160,432 A | 11/1992 | Gattuso | |
| 5,169,526 A * | 12/1992 | Gould | 210/242.3 |
| 5,183,579 A | 2/1993 | Eller | |
| 5,298,175 A | 3/1994 | Whidden, Jr. | |
| 5,316,672 A | 5/1994 | Wilson et al. | |
| 5,423,985 A * | 6/1995 | Addeo et al. | 210/924 |
| 5,478,483 A | 12/1995 | Gore | |
| 5,591,333 A | 1/1997 | Hobin et al. | |
| 5,792,350 A | 8/1998 | Sorley et al. | |
| 6,117,336 A * | 9/2000 | Sachse | 210/776 |

\* cited by examiner

ACTIVE BARRIER FOR POLLUTED WATERS AND METHOD FOR ITS INSTALLATION

FIELD OF THE INVENTION

The present invention relates to an active barrier to be used to contain and to collect polluting material which floats on a mass of water, such was ocean water, but not limited to it More specifically the present invention relates to an active barrier used to contain and to collect liquids lighter than water and which do not mix with it, such as petroleum and its products.

RELATED ART

In the most recent years it has been reported many cases of contamination by polluting agents of masses of waters, such as rivers, lakes, lagoons, bays and open oceans, petroleum being one of such polluting agents.

The problem is particularly critical in the case of a petroleum spill occurring in offshore oil wells, oil tankers, supply buoys, or during the transfer operation of oil from a tanker to a land-based facility, and the like.

When an oil spill occurs the tendency of the oil is to float over the mass of water, forming an oil stick, which has the tendency to spread throughout the surface of the water. If the oil spill is not contained rapidly, ocean currents and winds may carry the oil spill for great distances, or the oil spill can emulsify with the water, thereby jeopardizing the environmental. In some cases the oil spill can cause catastrophic damages.

Contemporary practice is to contain the oil spill before it reaches a size which makes containment impossible. Such containment also precludes the waving movement of the water from making the floating oil to emulsify with the water.

Containment of the oil spill is usually made by surrounding it with a floating barrier, which is deployed by at least one supporting vessel.

The floating barrier, also known by the experts as floating boom, usually comprises a plurality of modules which are interconnected at its end to at least one floating element The floating element can be tubular in shape, or shaped as a plate. It can be rigid and hollow, or rigid and made or stuffed with a material having specific gravity less than $1,0$ g/cm$^3$, so as it is able to float on the water.

It is also known in the art the use of a long inflatable tube, which is reeled to be transported to the place of use, where it is unreeled, inflated and deployed around the oil slick.

Use may be made of a combination of the above mentioned systems. Use can also be made of a skirt, which can be attached to or integral with the floating element, forming a lower skirt portion, usually provided with ballast in its lowermost portion to guarantee that it is duly stretched, so as to prevent oil from passing under the device due to the waving movement of the waters.

After the oil barrier has contained the oil slick, various means may be used to disperse, destroy, or collect the oil. The most rudimentary technic comprises launching pieces of absorbing material on the contained oil slick, in order that oil is absorbed within the space between the fibres of the pieces of absorbing material. Next the pieces of absorbing material are recovered in order that the oil absorbed within them is processed.

Another technic known in the art is to sprinkle a dispersing agent over the oil slick. Such technic is no longer used in view of the very strict environmental regulations, as dispersing agents may eventually cause even greater environmental damages than the oil spill.

Another technic known in the art is the use of skimmers to skim and collect the oil spill. The skimmers are installed in special vessels, such as a catamaran, and make use of rolls or endless caterpillars, which move to collect the uppermost layer of the oil skin over the water, by the effect of the surface tension. The oil is then collected in a reservoir located in the vessel.

The rolls or the caterpillar may be covered with a piece of absorbing material, or may instead have its surface shaped as a mesh, in order to collect a higher volume of oil. The vessel is provided with a washing station, where the rolls or the caterpillar are washed with water, and/or the absorbing material is compressed and concomitantly washed. Next, the fluids are collected and processed, to make the oil water separation The operation of the skimmer must be effective as far as washing and compression operations are concerned, in order that the operation does not last long. In some cases, in special when the oil is too viscid, the operation cannot be made as fast as desired.

Another technic known in the art is the use of a vessel provided with pumps having its end suction are connected to an end of pipes which have its other end located at the stern or alongside the hull, in contact with the surface of the water.

The vessel is set in position at an open part of the barrier, or can even pass over it, when the barrier is totally closed, in order to pump the uppermost layer of oil that floats on the water. Water is also pumped, and so the fluids are then processed, to make the oil water separation.

The effectiveness of the above mentioned systems is a direct function of the time elapsed from the occurrence of the oil spill to the containment and the collecting operations. Weather conditions such as rain, huge waving movements, strong winds, etc., can impair the effectiveness of the containment and collecting operations.

Further, if the deployment of the oil barrier is made too fast, and/or the weather conditions are not good (huge waving movements, strong winds), it is possible that a considerable volume of the oil slick pass under the oil barrier, in special as a consequence of the wake caused by the passage of a vessel near the oil barrier.

It is known in the art the use of an upward extension over the floating element of the barrier. Although this can address the problem of oil passing over the barrier, it is necessary to check whether or not the upright extension could cause problems to the stability of the barrier when it is used in waters having huge waving movements.

Some kinds of oil barriers known in the art have a limited use in view of its intrinsic features. As an example, it is known an oil barrier which has one end connected to the hull of a vessel, and the other end connected to the end of a jib projecting from the vessel. The oil barrier is carried by the vessel in such a way to surround the oil slick.

Such oil barrier has a very limited length, and therefore it is not effective to contain large oil slicks. Moreover, the wake caused by the vessel movement can cause a substantial volume of oil to pass under the oil barrier.

The way the connection between the modules of an oil barrier is made is a very important issue. Complex connection systems can cause a delay in the assemblage of the oil barrier. Connections of the type pin and ring are not safe, as, in case of the deployment of the barrier is made too rapidly, the pin and the ring can disconnect, rendering the system inoperative.

When use is made of inflatable modules, a failure in the inflation valve, or even a rupture in a module due to the contact with solids, or due to friction with the hull of the vessel, can render the system inoperative. Some barriers are provided with a number of temporary reservoir, which collects the oil during the dragging of the barrier. Such reservoir must be emptied from time to time. Besides causing some difficulties in its operation, in the case of the barrier being modular, such barriers require the use of a heavy and complex tube branch to interconnect the reservoirs, thereby causing problems to the stability of the barrier and making deployment slow.

Although all the above systems previously described usually operates well, all of them have the feature that part of the oil slick remains on the water at the end of the operation. Such remaining oil slick will then spread until being naturally degraded.

The above mentioned systems are described in the following patent documents:

U.S. Pat. No. 3,686,869, (Versatech Corporation);
U.S. Pat. No. 4,033,137, (James J. Geist);
U.S. Pat. No. 4,062,191, (Paul Preus);
U.S. Pat. No. 4,068,478, (Frank Meyers);
U.S. Pat. No. 4,381,994, (Shell Oil Company);
U.S. Pat. No. 5,160,432, (Peter Gattuso);
U.S. Pat. No. 5,169,526, (William L. Gould);
U.S. Pat. No. 5,183,579, (J. David Eller);
U.S. Pat. No. 5,298,175, (Malcolm B. Whidden, Jr.);
U.S. Pat. No. 5,316,672, (Elastec, Inc.);
U.S. Pat. No. 5,478,483, (Douglas J. Gore);
U.S. Pat. No. 5,591,333, (Sorbent Products Co., Inc.);
U.S. Pat. No. 5,792,350, (OSR Systems Ltd.).

SUMMARY OF THE INVENTION

The present invention relates to an active barrier which is to be used to contain and to collect polluting material which floats on a mass of water, preferably over an ocean, but not limited to it More specifically the invention relates to an active barrier which is to be used to contain and to collect liquids lighter tan the water and which do not mix with it, such as oil.

In a first aspect the present invention relates to an active barrier used to contain and to collect a floating polluting material which floats on a mass of water, the active barrier comprising:

a plurality of interconnected containment modules in such a way that the resulting length of the active barrier is enough to surround a mass of floating polluting materia;

at least two floats, installed vertically one over the other, substantially rigid and preferably tubular in shape, which serve to give the active barrier the ability to float;

a skirt rigidly connected to the underpart of the float, made in a flexible and high strength material and able to resist traction, said skirt having the same length as the float and serving to hinder floating polluting material to pass under the active barrier, said skirt being provided with a ballast at its undermost part, which serves to keep the active barrier stable and tensioned;

two substantially flexible collecting tubes having the same length as the floats, each of them located alongside each sides of the floats, said collecting tubes serving to collect and to transport to a location the collected mixture of water and floating polluting material, to dean up the mass of water from said floating polluting material;

male and female relatively flexible quick connection joints, each of them located at opposite ends of each collecting tube of the active barrier, said connection joints allowing the collecting tubes to be male to female interlinked, and therefore the containment modules, thereby forming the active barrier;

said collecting tubes provided with a plurality of openings, equally spaced apart along the entire length of each collecting tube, said openings being located in the face of the collecting tubes opposite to the floats, facing the mass of floating polluting material, in order to allow water and floating polluting material to enter into the collecting tubes;

a pumping train, formed by impeller units, which displaces into said collecting tubes, said impeller units being continuous or spaced apart, the displacement of said pumping train causing a continuous suction of polluted waters to the interior of the collecting tubes, the displacement of the pumping train being provoked by traction devices located at the supporting units;

each of said supporting units provided with traction and treatment assemblages, which are each connected to the two ends of the active barrier, said traction and treatment assemblages serving to provide traction to said pumping means, and to collect and to treat said floating polluting material;

a tank comprising a first hermetic compartment, a second hermetic compartment and a third hermetic compartment;

said first hermetic compartment is used to collect the mixture of water and floating polluting material collected in the active barrier and to wash the impeller cups by immersion in solvent;

said second hermetic compartment is used to receive the mixture of water, polluting material and the solvent which come from the first hermetic compartment; and the third hermetic compartment is used to rinse the impeller cups, by means of jets of fluid, before they come back to the active barrier.

In a second aspect the present invention relates to a method to deploy the active barrier, comprising the following steps:

a-position the two supporting units near the floating polluting material to be confined;

b-connect two impeller modules of a first containment module of the active barrier to two impeller modules located into a traction and treatment assemblage located at one of the two supporting units, the connection being made by quick connectors;

c-connect the collecting tubes of said first containment module of the active barrier to the ends of the connecting tubes of the traction and treatment assemblages, by means of the connection joints;

d-connect two impeller modules of a second containment module of the active barrier to the ends of two impeller modules of the first containment module of the active barrier;

e-connect the end of the ballast of the skirt of the second containment module of the active barrier to the end of the ballast of the skirt of the first containment module of the active barrier, by means of the connecting system;

f-connect the collecting tube of the second containment module of the active barrier to the end of the collecting tube of the first containment module of the active barrier, by means of the connection joints;

g-repeat the above steps "d", "e" and "f" until the length of the active barrier is enough to surround the floating polluting material;

h-connect the two impeller modules of the last containment module of the active barrier to the two impeller modules existing into the traction and treatment assemblages of the second supporting unit, by means of the quick connector;

i-connect the collecting tubes of the last containment module of the active barrier to the ends of the connecting tubes of the traction and treatment assemblages, by means of the connection joints;

j-drive the pumping train by means of each traction device existing in each of the two supporting unit, at the same time.

BRIEF DESCRIPTION OF THE DRAWINGS

The features of the active barrier for polluted waters object of the present invention will be better understood from the following detailed description, which is made merely for the purpose of exemplification, and associated with the following drawings, which are part of the present specification.

DETAILED DESCRIPTION OF THE INVENTION

The active barrier for polluted waters and the method for its use, objects of the present invention, will be hereon described with reference to the drawings and in accordance with the identification of the parts which form part of the invention.

The present invention relates to an active barrier used to contain and to collect polluting material floating over bodies of water, such as rivers, lakes, lagoons, bays or open oceans.

In the description which is hereon made the active barrier is used in an ocean, for explanation only, although the active barrier may be used to confine and to collect any kind of floating polluting material including small solid debris, the description will be made for a situation in that pollution is caused by a liquid lighter than the water and immiscible with it More specifically, de description will be made for a situation in that an oil spill occur in the ocean.

Figure 1:
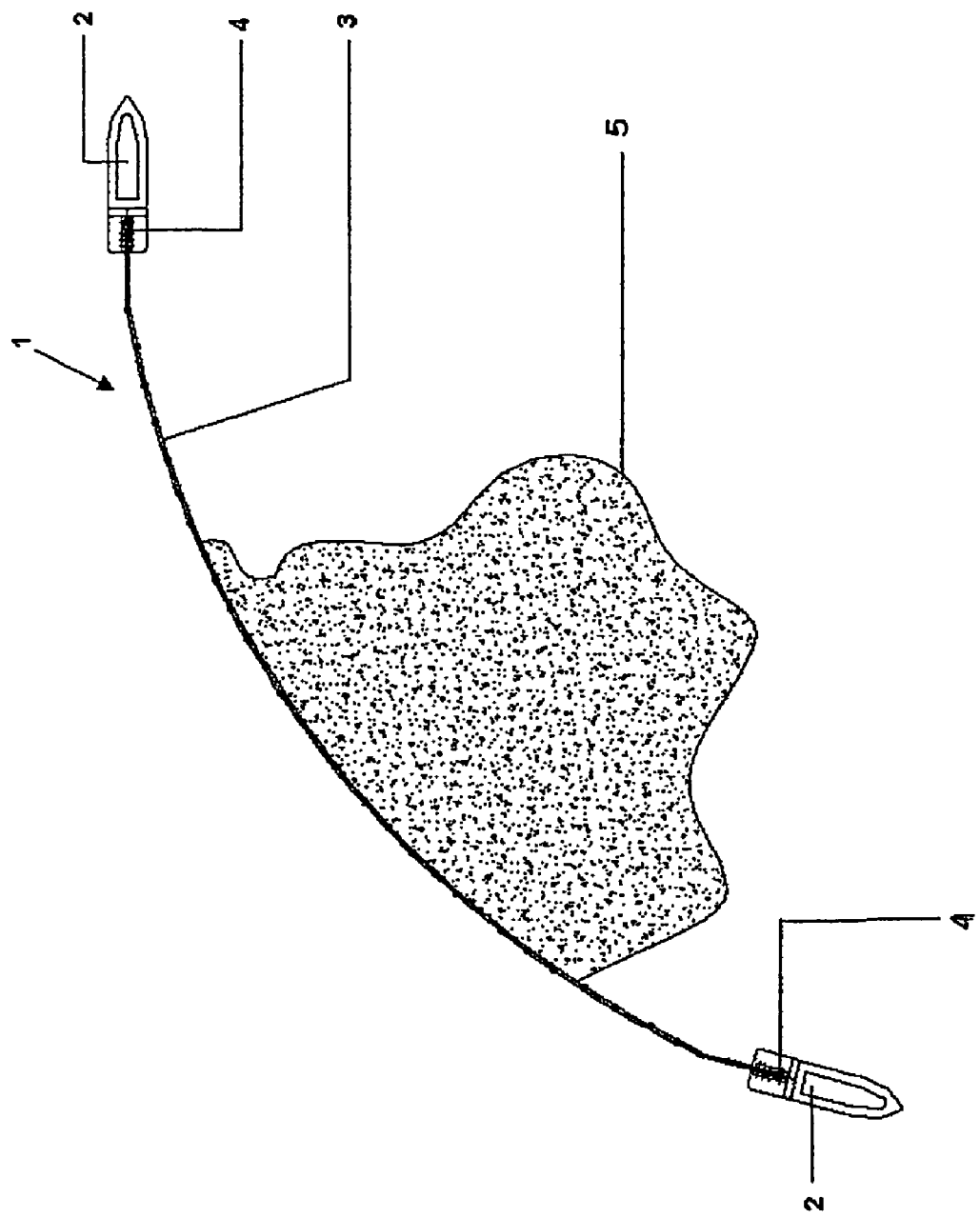
FIG. 1 depicts a top view of the active barrier being deployed by two supporting vessels.

In FIG. 1 it can be noticed that the active barrier (1) object of the present invention is supported at its two ends by two supporting units (2), which can be located onshore or, as depicted in FIG. 1, in two supporting vessels.

The active barrier (1) comprises:

a plurality of containment modules (3), which are interconnected one to another so as to form a length of the active barrier (1) enough to surround the floating polluting material (5). The containment modules (3), which are provided with a pumping means to pump out the floating polluting material, serve as a means to confine and to collect said floating polluting material;

two traction and treatment assemblages (4), each of them installed in each supporting units (2) and connected by a connecting means to each ends of the active barrier (1). Said traction and treatment assemblages (4) serve to make traction on said pumping means, to collect and treat the collected floating polluting material.

Figure 2:
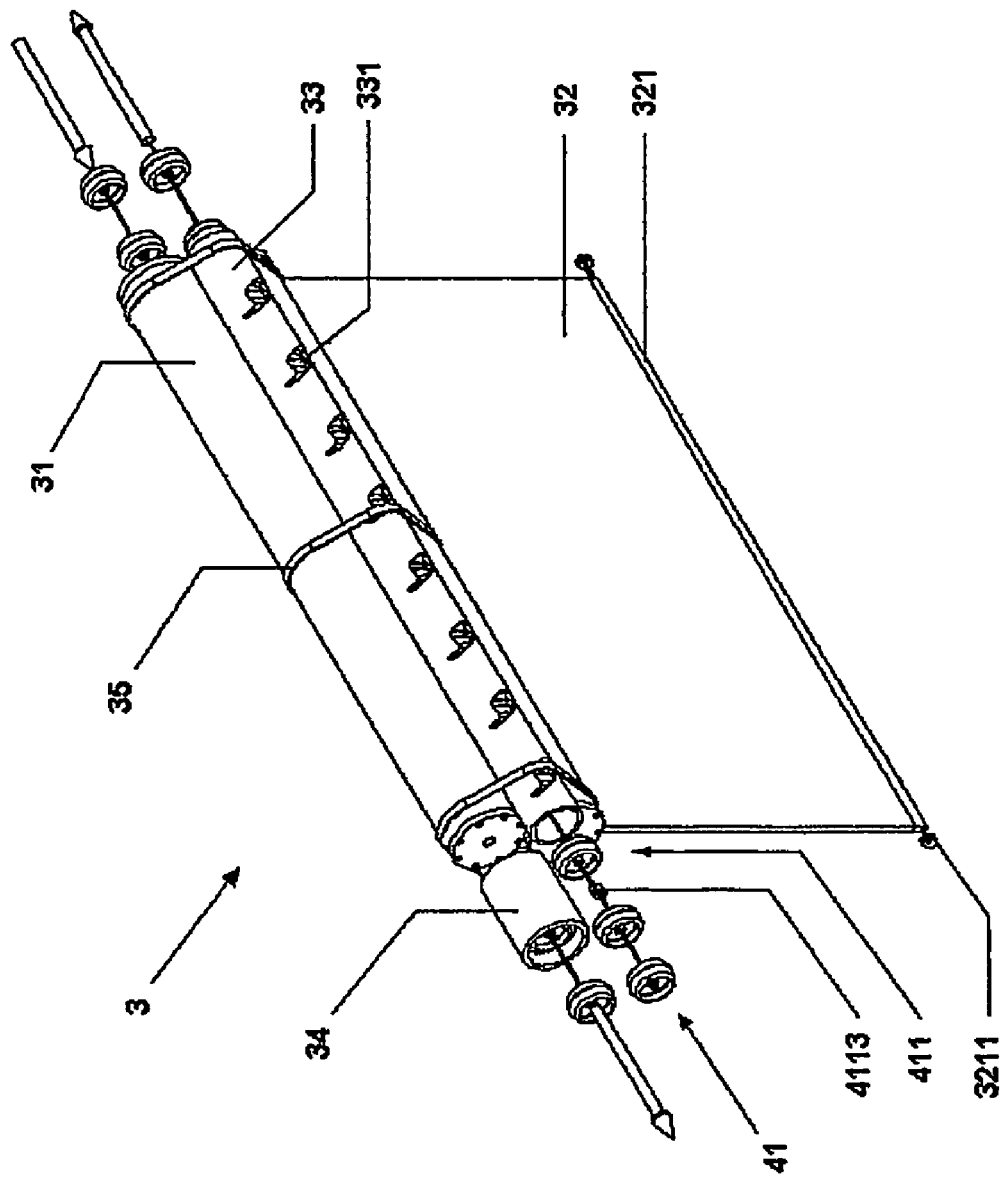
FIG. 2 depicts a perspective view of a first embodiment of an interconnectable module which is part of the active barrier of the present invention, which is provided with impellers in the shape of a cup.

FIG. 2 depicts one of the containment modules (3) which form part of the active barrier (1) of the present invention. In this embodiment it can be seen that the containment module (3) comprises:

at least two floats (31), installed vertically one over the other, substantially rigid and preferably tubular in shape, the ends of them being blocked in order to confine air into them. Alternatively the floats (31) may be stuffed with a hydrophobic material, or may be integrally made in a material of high flatability, that is, having a density less than 1,0, in order that to give the active barrier (1) the ability to float;

a skirt (32), rigidly connected to the underpart of the float (31), which is made in a flexible and high strength material, able to resist traction. The skirt (32) has the same length as the float (31), and serves to hinder floating polluting material to pass under the active barrier (1). The skirt (32) is provided with a ballast (321) at its undermost part, which serves to keep the active barrier (1) stable and tensioned;

two collecting tubes (33), having the same length as the floats (31), made in a substantially flexible material, each of them located alongside each sides of the floats (31). The collecting tubes (33) serve to collect and to transport to a location the collected mixture of water and floating polluting material, to dean up the water from said floating polluting material;

male and female relatively flexible quick connection joints (34), each of them located at opposite ends of each collecting tube (33) of the active barrier (1). The connection joints (34) allow the collecting tube (33) to be male to female interlinked, and therefore the containment modules (3), thereby forming the active barrier (1).

The structural parts of the containment modules (3) of the active barrier (1) are connected one to another by means of external means, preferably by pipe brackets (35).

The ballast (321) of the skirt (32) is made in a heavy material, but is able to freely move to any direction, and may comprise, for example, chains. The ballast (321) must have the same length as the skirt (32), and is provided at its ends with a conventional quick connecting system (3211), which allow the ballast (321) of the skirt (32) to be connected to a similar ballast (321) existing in a skirt (32) of an adjacent containment module (3).

The collecting tubes (33) are provided with a plurality of openings (331), equally spaced apart along the length of each collecting tube (33). The openings (331) are located in the faces of the collecting tubes (33) opposite to the floats (31), facing the mass of floating polluting material (5), in order to allow water and floating polluting material to enter into the collecting tubes (33).

The openings (331) may have a number of shapes, and whatsoever is the shape, the important is that the openings (331) must allow water and floating polluting material to enter into the collecting tubes (33). Among the various shapes used in the openings (331) it can be mentioned the following: circular; sloped oblong, elliptic, the integral "S" shape being the preferred one.

A pumping train (41) is able to pass into the collecting tubes (33). The pumping train (41) comprise a plurality of impeller modules (411).

Figure 3:
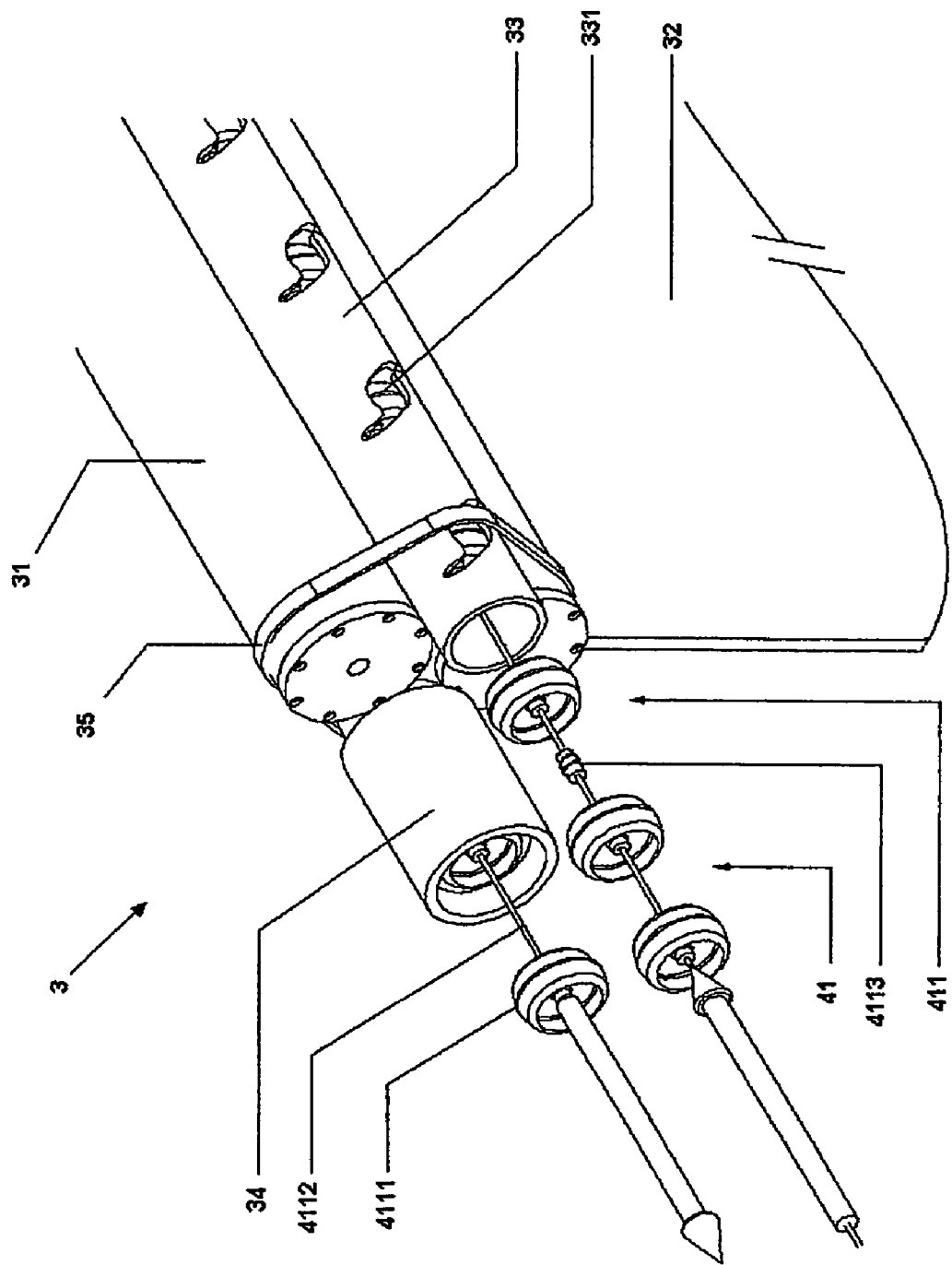
FIG. 3 depicts an enlarged perspective view of one of the ends of the interconnectable module depicted in FIG. 2.

In FIG. 3 it is shown with more details a first embodiment of the parts of each impeller module (411), which is part of a traction and treatment assemblage (4).

Each impeller module (411) located into each collecting tube (33) of each containment module (3) of the active barrier (1) has the same length as the collecting tube (33). The impeller module (411) comprise a plurality of impellers cups (4111), equally spaced apart and fixed to a segment of cable (4112), the latter being provided in each of its ends with a quick connector (4113), which enables the impeller module (411) to be connected to a impeller module (411) of another containment module (3).

Each containment module (3) of the active barrier (1) is provided with two impeller modules (411), which displace in opposite directions into each collecting tube (33).

Figure 4:
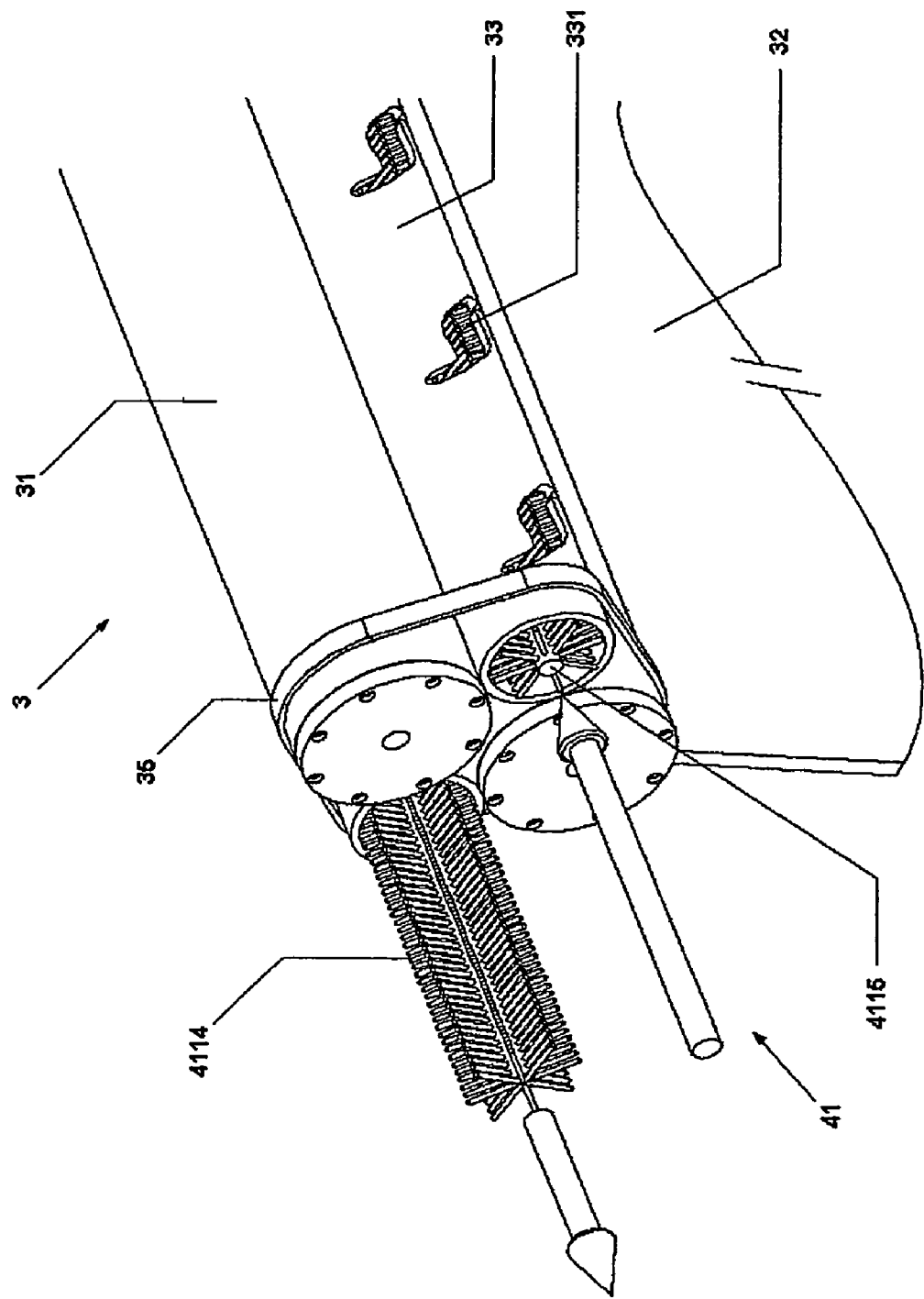
FIG. 4 depicts a perspective view of a second embodiment of an interconnectable module which is part of the active barrier of the present invention, which is provided with impellers in the shape of bristle.

In FIG. 4 it is shown a further embodiment of the impeller module (411), where the impeller cup (4111) is replaced by impeller bristles (4114), having the same features of the embodiment previously described.

The displacement of the pumping train (41) into the collecting tube (33) causes a suction effect, due to the differential pressure derived from the displacement, and therefore a mixture of water and floating polluting material is sucked into the collecting tube (33), through the openings (331). The collected fluids are then carried to the supporting unit (2) by the pumping effect caused by the displacement of the pumping train (41).

Figure 5:
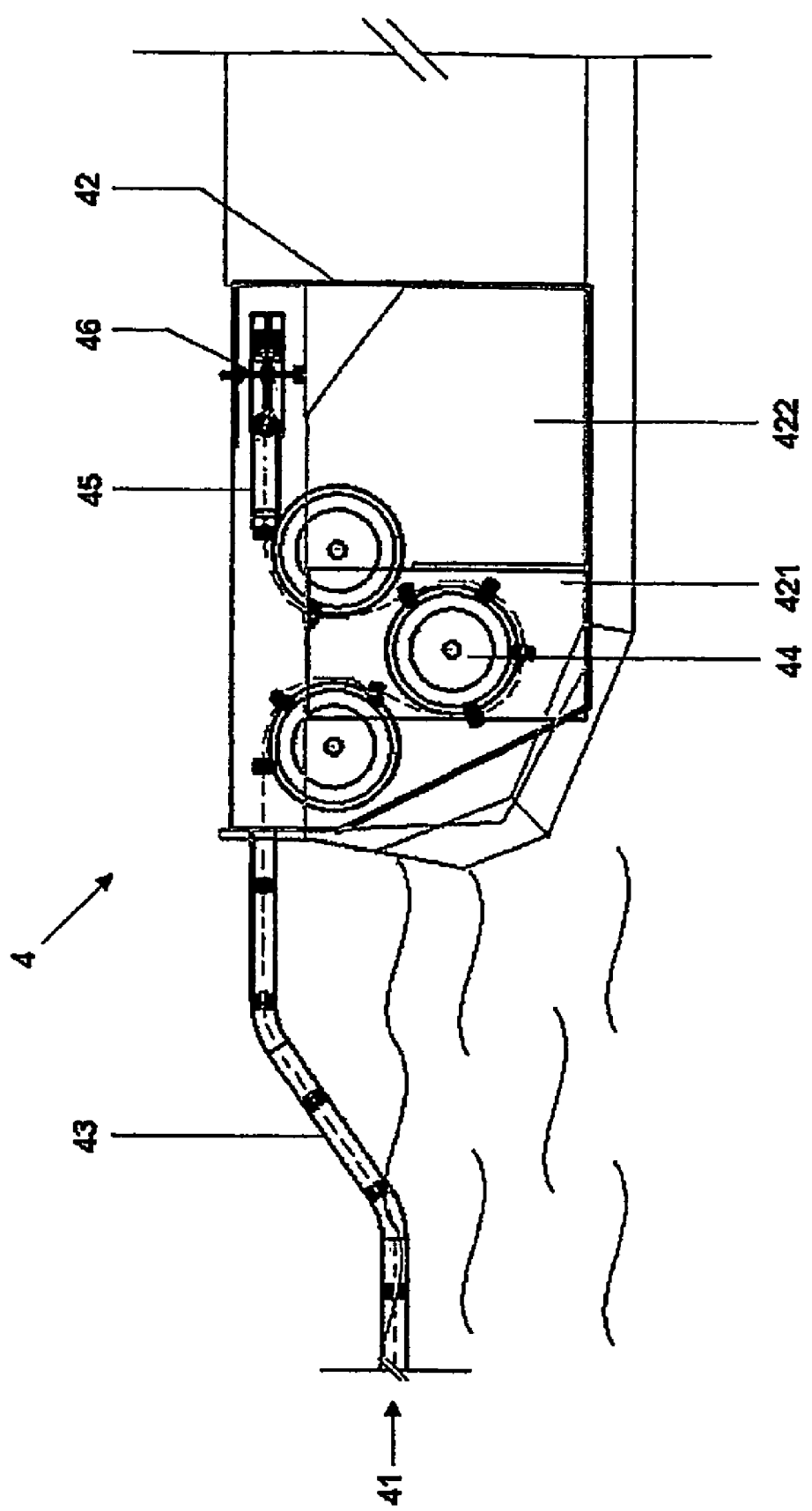
FIG. 5 depicts a partial cross sectional view of the hull of a vessel which carries the traction system of the impellers.

FIG. 5 depicts a partial cross sectional view of the traction and treatment assemblage (4), which, in the present case, is located in a vessel, partially shown in faint lines. It can be observed that the traction and treatment assemblage (4) comprises:

a tank (42), comprising a first hermetic compartment (421), a second hermetic compartment (422) and a third hermetic compartment (423). The third hermetic compartment (423) is not shown in the FIG. 5 because it is behind the first hermetic compartment (421). The first, second and third hermetic compartments (421; 422; 423) serve to collect and to theat the collected fluids (water and polluting material);

two connecting tubes (43), rigidly connected at a first end to the tank (42), which are curved in such a way that the second end can be located at the ocean level, said second level being connected to a collecting tube (33) of a containment module (3) of the active barrier (1). The connecting tubes (43) serves to ultimately carry the mixture of water and floating polluting material collected in the active barrier (1) to the tank (42);

two vertical double pulleys (44), both located into the tank (42), a first one located at the first hermetic compartment (421), and a second one located at the third hermetic compartment (423). The first pulley (44) serves to guide the pumping train (41) arising from one of the connecting tubes (43) towards said first, second and third hermetic compartments (421; 422; 423), and te second pulley (44) serves to guide the pumping train (41) when it leaves the tank (42) towards the other of the connecting tubes (43) connected to the active barrier (1);

two horizontal guiding tubes (45), located immediately after the last pulley (44), serving to guide the pumping train (41) in the interior of the tank(42);

a traction device (46), horizontally located at the upper part of the tank (42), driven by a source of power not shown in FIG. 5. The traction device (46) causes the pumping train (41) to displace into the collecting tubes (33) of the containment modules (3) which form the active barrier (1).

Figure 6:
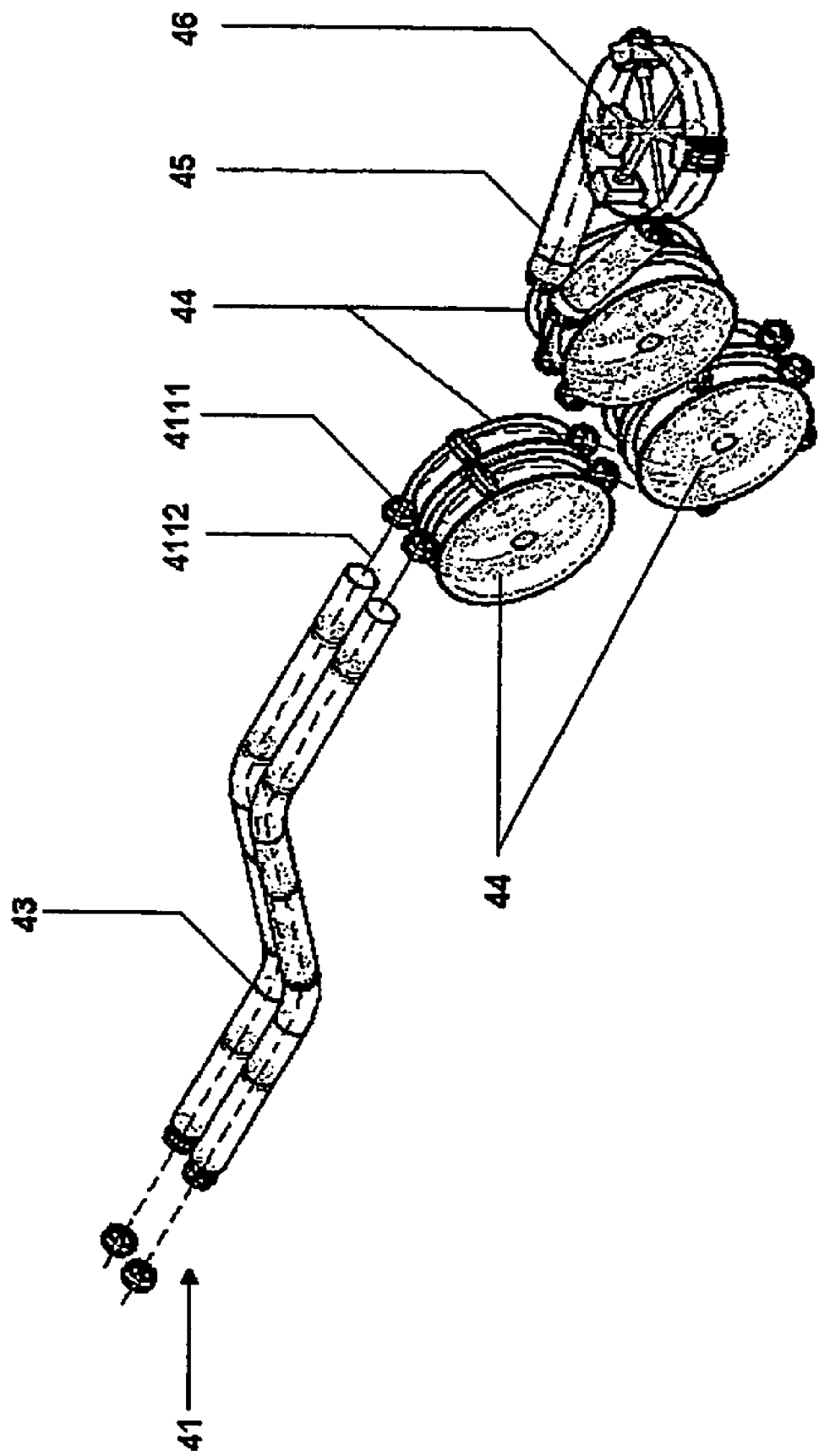
FIG. 6 depicts a perspective view of the driving and traction parts which are part of the traction system of the impellers.

FIG. 6 depicts the components which comprise the driving and guiding traction parts of the traction and treatment assemblage (4). It can be observed that the pumping train (41), coming from one of the collecting tubes (33) of a containment module (3) at one end of the active barrier (1), enters into one of the connecting tubes (43), and is guided by one of the pulleys (44) into the first hermetic compartment (421) (not shown in FIG. 6), and reaches one of the guiding tubes (45).

The pumping train (41) is then guided by said one of the guiding tube (45) to the traction device (46), which exert traction in the pumping train (41). The latter is then guided to the other of the guiding tubes (45), passes by the second one of the double pulleys (44) located at the interior of the third hermetic compartment (423), enters into the other of the connecting tubes (43), and is finally introduced into the other of the collecting tubes (33) of the same containment module (3) of the active barrier (1) previously mentioned.

Figure 7:
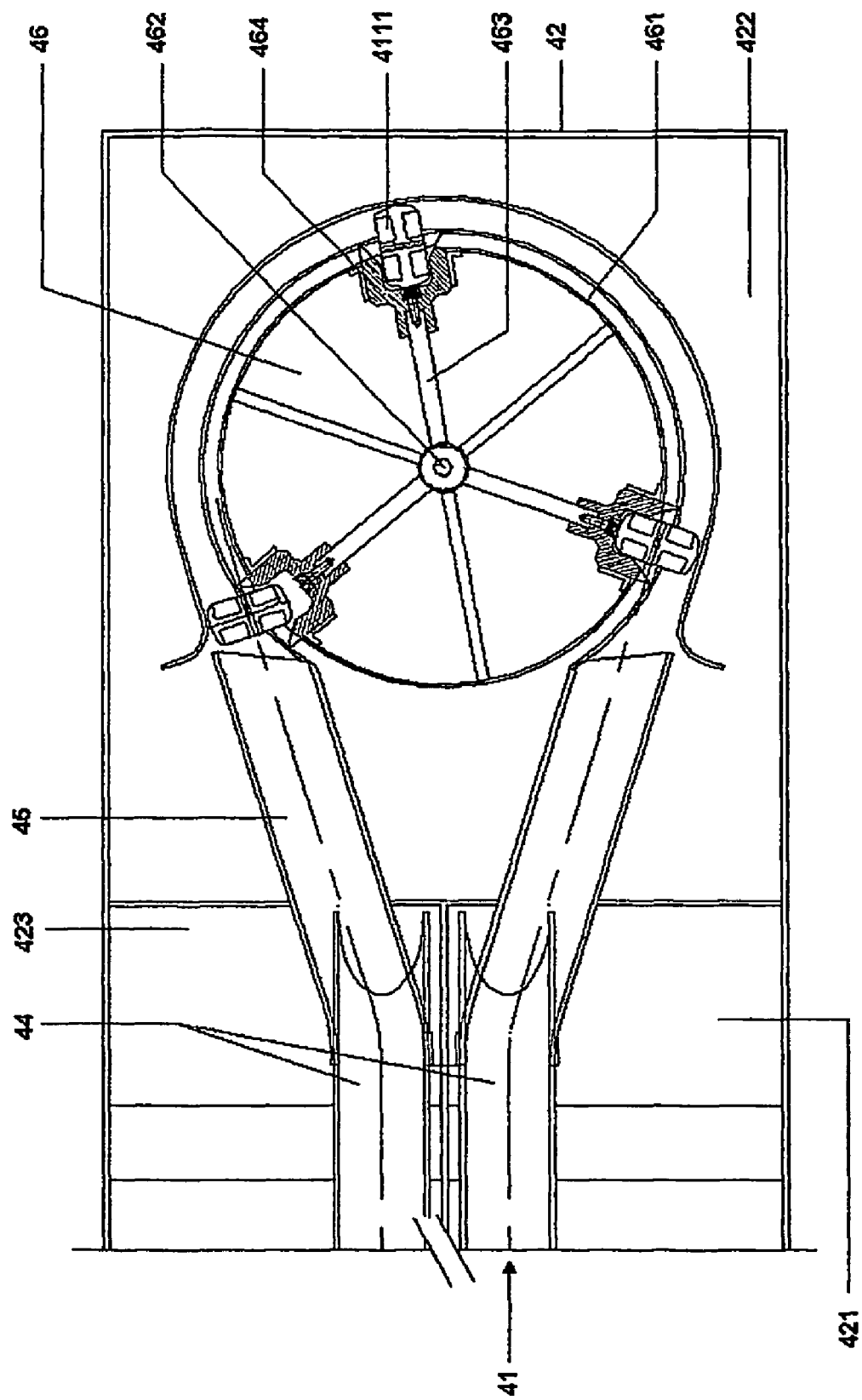
FIG. 7 depicts the traction device which is responsible for providing traction to the pumping train.

FIG. 7 depicts an enlarged view of the traction device (46) which is responsible for providing traction to the pumping train (41). As previously mentioned the traction device (46) is horizontally located into the tank (42), connected to a source of power which may be an electric motor or a internal combustion engine, and the connection may be made by belts or by a gear box. Such parts are not shown in the Figure because they are well known in the art.

The traction device (46) comprises a cylindrical body (461) connected to a central shaft (462) by spokes (463). The cylindrical body (461) is additionally provided with traction cradles (464), fixed to some of the spokes (463). The impeller cups (4111) are received into the traction cradles (464), and, due to the rotating movement of the traction device (46), a impeller cup (4111) received into a traction cradle (464) is urged to move forward, thereby causing the pumping train (41) to move.

The number of spokes (463) having traction cradles (464) used in the traction device (46) will depend on the spacing of the impeller cups (4111) along the pumping train (41). In the present embodiment use is made of three traction cradles (464) angularly distributed in the edge of the cylindrical body (461) of the traction device (46).

Figure 8:
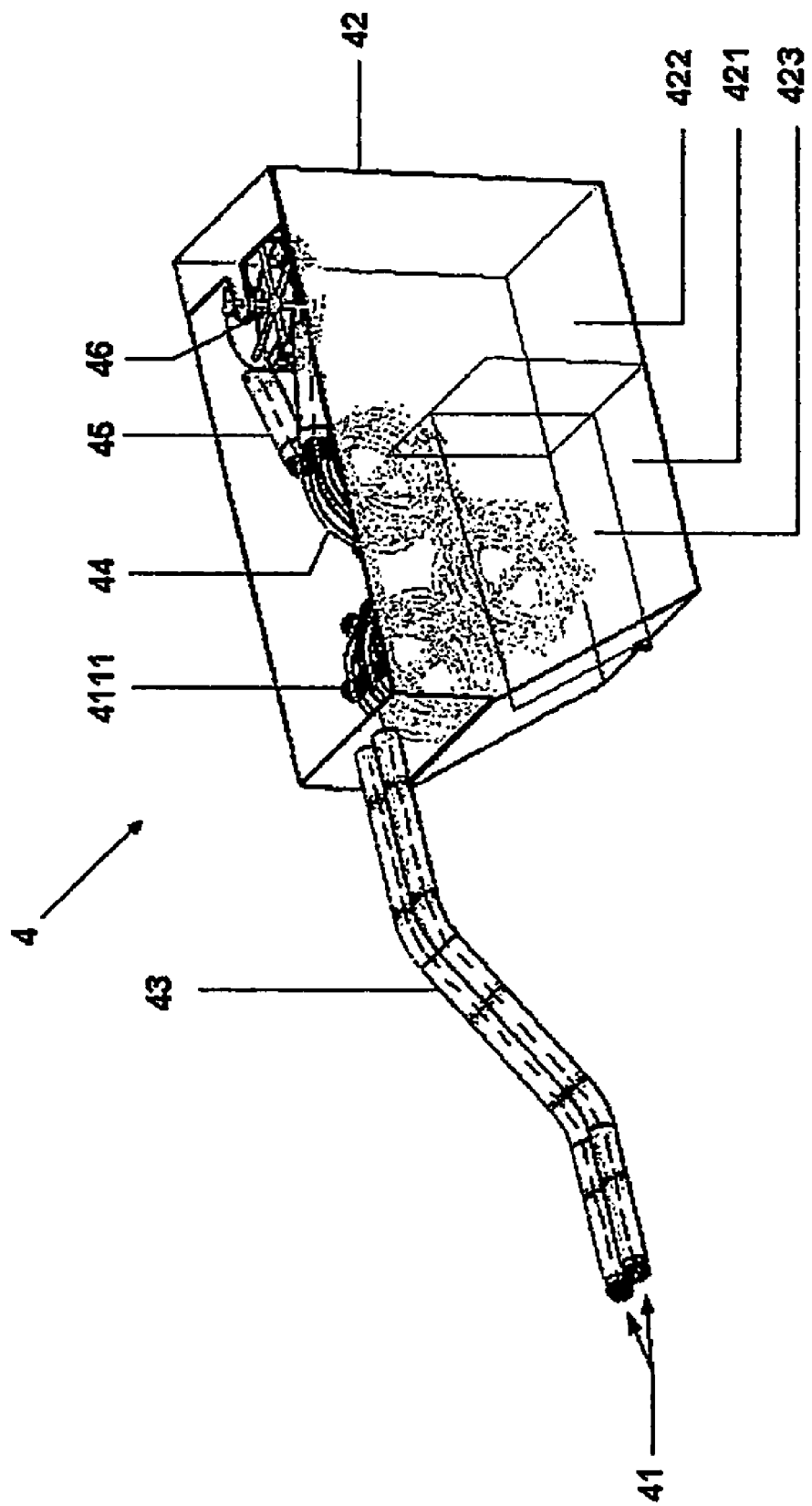
FIG. 8 depicts a perspective view, partially in phantom, showing the tank where is housed the traction device, the impellers washing assemblage and where oil is collected for separation.

FIG. 8 depicts a perspective view, partially in phantom, showing the traction and treatment assemblage (4) and the positioning of the first, second and third hermetic compartments (421; 422; 423) into the tank (42).

The first hermetic compartment (421) is used to collect the mixture of water and floating polluting material collected in the active barrier (1) and to wash the impeller cups (4111), by immersion in solvent.

The second hermetic compartment (422) is used to receive the mixture of water, polluting material and solvent which come from the first hermetic compartment (421).

The impeller cups (4111) are rinsed into the third hermetic compartment (423), by means of jets of fluid, and the impeller cups (4111) are then ready to come back to the active barrier (1).

The active barrier (1) may be used in a number of ways, depending on the situation. If it is used in a river, for example, the two ends of the active barrier (1) should be connected to supporting units (2) located at each of the river banks. If the active barrier (1) is used in a lagoon or in a lake, one of its end may be connected to a supporting unit (2) located on shore, and the other end may be connected to a floating vessel or the like, in order that the active barrier may be moved to confine the floating polluting material (5). If the oil barrier is used in the open ocean, then it is required the use of two vessels to carry the two supporting units (2), in order to contain the floating polluting material (5).

The method for deployment of the active barrier (1) according to the present invention will be hereon described.

When it appears a situation in that it is necessary to confine and to collect a floating polluting material (5) which floats in the surface of a mass of water, e.g., an open ocean, the active barrier (1) is deployed according to the following steps:

a-position the two supporting units (2) near the floating polluting material (5) to be confined;

b-connect two impeller modules (411) of a first containment module (3) of the active barrier to two impeller modules (411) located into a traction and treatment assemblage (4) located at one of the two supporting units (2), the connection being made by quick connectors (4113);

c-connect the collecting tubes (33) of said first containment module (3) of the active barrier (1) to the ends of the connecting tubes (43) of the traction and treatment assemblages (4) by means of the connection joints (34);

d-connect two impeller modules (411) of a second containment module (3) of the active barrier (1) to the ends of two impeller modules (11) of the first containment module (3) of the active barrier (1);

e-connect the end of the ballast (321) of the skirt (32) of the second containment module (3) of the active barrier (1) to the end of the ballast (321) of the skirt (32) of the first containment module (3) of the active barrier (1), by means of the connecting system (3211);

f-connect the collecting tube (33) of the second containment module (3) of the active barrier (1) to the end of the collecting tube (33) of the first containment module (3) of the active barrier (1), by means of the connection joints (34);

g-repeat the above steps "d", "e" and "f" until the length of the active barrier (1) is enough to surround the floating polluting material (5);

h-connect the two impeller modules (411) of the last containment module (3) of the active barrier (1) to the two impeller modules (411) existing into the traction and treatment assemblages (4) of the second supporting unit (2), by means of the quick connector (4113);

i-connect the collecting tubes (33) of the last containment module (3) of the active barrier (1) to the ends of the connecting tubes (43) of the traction and treatment assemblages (4), by means of the connection joints (34);

j-drive the pumping train (41) by means of each traction device (46) existing in each of the two supporting unit (2), at the same time.

It should be mentioned that although the invention may be embodied in ways other than the embodiment above described, it must be clarified that the invention is not limited only to this embodiment, and those with technical abilities will immediately realize that alterations and substitutions can be made without straying from the described inventive concept.

Thus, the descriptive embodiment of the active barrier for polluted waters and of its installation method must be only understood as exemplifications to facilitate the comprehension of the invention. Therefore, the invention is not limited to the disclosed embodiments, and it is only limited to the following claims.

The invention claimed is:

1. Active barrier for waters polluted by material lighter than the water and immiscible with it, used to contain and to collect a floating polluting material which floats on a mass of water, said active barrier being supported by two supporting units and comprising a plurality of interconnected containment modules provided with a pumping means able to pump out said floating polluting material in such a way that the resulting length of the active barrier is enough to surround said floating polluting material, said active barrier being characterised in that:

each of said supporting units is provided with traction and treatment assemblages, which are each connected to the two ends of the active barrier, said traction and treatment assemblages serving to provide traction to said pumping means, and to collect and to treat said floating polluting material, each containment module comprises:

at least two floats, made in a material having a density less than 1,0, stuffed with a hydrophobic material, with blocked ends in order to confine air into them, installed vertically one over the other, substantially rigid and tubular in shape, which serve to give the active barrier the ability to float;

a skirt, rigidly connected to the underpart of the float, which is made in a flexible and high strength material, able to resist traction, said skirt having the same length as the float, said skirt serving to hinder floating polluting material to pass under the active barrier, said skirt at its undermost part being provided with a ballast made in a heavy material, but able to freely move to any direction, said ballast having the same length as the skirt, and being provided at its ends with a Quick connecting system, which allow said ballast of said skirt to be connected to a similar ballast existing in a skirt of an adjacent containment module, which serves to keep the active barrier stable and tensioned;

two collecting tubes, which are provided with a plurality of openings, equally spaced apart along the entire length of each collecting tube, said openings being located in the face of the collecting tubes opposite to the floats, facing the mass of floating polluting material, in order to allow water and floating polluting material to enter into the collecting tubes, having the same length as the floats, substantially flexible, each of them located alongside each sides of the floats, said mixture of water and floating polluting material, to clean up the mass of water from said floating polluting material;

two impeller modules, which displace in opposite directions into each collecting tube, said impeller module is in the shape of impeller bristles which project radially from a segment of cable;

male and female relatively flexible quick connection joints, each of them located at opposite ends of each collecting tube of the active barrier, said connection joints allowing the collecting tube to be male to female interlinked, and therefore the containment modules, thereby forming the active barrier;

a pumping train comprises a plurality of impeller modules which displace into the collecting tubes, said displacement of the pumping train into the collecting tube causes a suction effect, due to the differential pressure derived from such displacement, which causes a mixture of water and floating polluting material to be sucked into the collecting tube through the openings, the collected fluids being then carried to the supporting unit by the pumping effect caused by the displacement of the pumping train, each impeller module existing into each collecting tube of each containment module of the active barrier has the same length as the collecting tube, said impeller module comprising a plurality of impeller cups equally spaced apart and fixed to a segment of cable, the latter being provided in each of its ends with a quick connector, which enables the impeller module to be connected to a impeller module of another containment module;

a traction and treatment assemblage comprises:

a tank, comprising a first hermetic compartment which is used to collect the mixture of water and floating polluting material collected in the active barrier and to wash the impeller cups by immersion in solvents, a second hermetic compartment used to receive and to treat the mixture of water, polluting material and solvent which come from the first hermetic compartment and a third hermetic compartment, in which said impeller cups are rinsed by means of jets of fluid, before the impeller cups come back to the active barrier, said first, second and third hermetic compartments serving to collect and to treat the collected water and floating polluting material;

two connecting tubes, rigidly connected at a first end to the tank, which are curved in such a way that the second end can be set at the ocean level, said second level being connected to a collecting tube of a containment module of the active barrier, said connecting tubes serving to ultimately carry the mixture of water and floating polluting material collected in the active barrier to the tank;

two vertical double pulleys, both located into the tank, a first one located at the first hermetic compartment, and a second one located at the third hermetic compartment, the first pulley serving to guide the pumping train arising from one of the connecting tubes towards said first, second and third hermetic compartments, and te second pulley serving to guide the pumping train when it leaves the tank towards the other of the connecting tubes connected to the active barrier;

two horizontal guiding tubes, located immediately after the last pulley, serving to guide the pumping train in the interior of the tank;

a traction device, horizontally located at the upper part of the tank, driven by a source of power, said traction device comprises a cylindrical body connected to a central shaft by spokes, said cylindrical body being additionally provided with traction cradles, which number depends on the spacing of the impeller cups long the pumping train, fixed to some of the spokes, said traction cradles serving to receive into them and to urge to move forward an impeller cup of the impeller module, said traction device causing the pumping train to displace into the collecting tubes of the containment modules which form the active barrier.

2. Active barrier, according to claim 1, characterised in that the structural components of the containment modules of the active barrier being interconnected by pipe brackets.

3. Active barrier, according to claim 1, characterised in that said heavy material are chains.

4. Active barrier, according to claim 1, characterised in that said openings are circular in shape.

5. Active barrier, according to claim 1, characterised in that said openings are sloped oblong in shape.

6. Active barrier, according to claim 1, characterised in that said openings are elliptical in shape.

7. Active barrier, according to claim 1, characterised in that said openings have the shape of a integral "S".

8. Active barrier, according to claim 1, characterised in that said displacement of the pumping train into the collecting tube causes a suction effect, due to the differential pressure derived from such displacement, which causes a mixture of water and floating polluting material to be sucked into the collecting tube, through the openings, the collected fluids being then carried to the supporting unit by the pumping effect caused by the displacement of the pumping train.

9. Active barrier, according to claim 1, characterised in that said pumping train coming from one of the collecting tubes of a containment module at one end of the active barrier enters into one of the connecting tubes, is guided by one of the pulleys into the first hermetic compartment, and reaches one of the guiding tubes, which guides said pumping train to the traction device, which exert traction in the pumping train, said pumping train is then guided to the other of the guiding tubes, passes by the second one of the double pulleys located at the interior of the third hermetic compartment, enters into the other of the connecting tubes, and is finally introduced into the other of the collecting tubes of the same containment module of the active barrier previously mentioned.

10. Active barrier, according to claim 1, characterised in that three traction cradles are angularly distributed in the edge of the cylindrical body of the traction device.

11. A Method to deploy an active barrier characterised in that it comprises the following steps:

a-positioning two supporting units near a body of floating polluting material to be confined;

b-connecting two impeller modules of a first containment module of the active barrier to two impeller modules located into a traction and treatment assemblage located at one of the two supporting units, the connection being made by quick connectors;

c-connecting collecting tubes of said first containment module of the active barrier to the ends of connecting tubes of the traction and treatment assemblages, by means of connection joints;

d-connecting two impeller modules of a second containment module of the active barrier to the ends of two impeller modules of the first containment module of the active barrier;

e-connecting the end of a ballast of a skirt of the second containment module of the active barrier to the end of a ballast of a skirt of the first containment module of the active barrier, by means of a connecting system;

f-connecting the collecting tube of the second containment module of the active barrier to the end of the collecting tube of the first containment module of the active barrier, by means of the connection joints;

g-repeating the above steps "d", "e" and "f" until the length of the active barrier is enough to surround the floating polluting material;

h-connecting the two impeller modules of a last containment module of the active barrier to the two impeller modules in the traction and treatment assemblages of the second supporting unit, by means of the quick connector thereby forming a pumping train;

i-connecting the collecting tubes of the last containment module of the active barrier to the ends of the connecting tubes of the traction and treatment assemblages, by means of the connection joints;

j-driving the pumping train by means of each traction device existing in each of the two supporting unit, at the same time.

* * * * *